United States Patent [19]

Runnels, Jr.

[11] 3,917,193
[45] Nov. 4, 1975

[54] BOUNDARY LAYER CONTROL AND ANTI-ICING APPARATUS FOR AN AIRCRAFT WING

[75] Inventor: Joe Neal Runnels, Jr., Bellevue, Wash.

[73] Assignee: The Boeing Company, Seattle, Wash.

[22] Filed: Jan. 21, 1974

[21] Appl. No.: 435,251

[52] U.S. Cl...... 244/42 CC; 244/42 CA; 244/134 B
[51] Int. Cl.² .................... B64C 21/04; B64D 15/02
[58] Field of Search ...... 244/42 CA, 42 CC, 42 CB, 244/42 R, 42 C, 42 D, 134 R, 134 B, 134 C, 131; 248/55, 78; 403/381; 285/61

[56] References Cited
UNITED STATES PATENTS

| | | | |
|---|---|---|---|
| 1,775,757 | 9/1930 | Gay | 244/42 CC |
| 2,091,395 | 8/1937 | Perrin | 244/134 C |
| 2,427,972 | 9/1947 | Melchior | 244/42 CF |
| 2,470,128 | 5/1949 | Barrick et al. | 244/134 B |
| 2,735,519 | 2/1956 | Frischmann | 403/381 |
| 2,886,264 | 5/1959 | Seager | 244/42 CC |
| 2,945,653 | 7/1960 | Atkin | 244/131 |
| 3,142,457 | 7/1964 | Quenzler | 244/42 CC |
| 3,275,265 | 9/1966 | Alvarez-Calderon | 244/42 CC |
| 3,363,859 | 1/1968 | Watts | 244/42 CA |
| 3,696,233 | 10/1972 | Pulsifer | 403/381 X |

FOREIGN PATENTS OR APPLICATIONS

| | | | |
|---|---|---|---|
| 1,103,426 | 11/1955 | France | 244/42 CC |

Primary Examiner—Trygve M. Blix
Assistant Examiner—Barry L. Kelmachter
Attorney, Agent, or Firm—christensen, O'Connor, Garrison & Hauelka

[57] ABSTRACT

A boundary layer control (BLC) and anti-icing apparatus for an aircraft wing comprising a duct in thermal communication with the leading edge (nose) of the wing and a leading edge flap is disclosed. The duct carries relatively high temperature air bled from the engines, and ejects this air through BLC nozzles and anti-icing orifices located in the lower portion of the nose. The leading edge flap is movable between a stowed position in the wing and an operative position adjacent to the leading edge of the wing. When in the stowed position the high temperature air in the duct functions to prevent ice formation on the wing, as does the ejected air which attaches to the wing skin and flows over the top of the wing, thereby wiping away water droplets. When in the operative position, the adjacent surfaces of the leading edge flap and the nose of the wing form an ejector nozzle that mixes the BLC nozzle ejected air with ambient air and then ejects the mixed air over the wing surface to provide boundary layer control. In addition, when the leading edge flap is in its operative position, thermal anti-icing mixing tubes receive the air ejected through the anti-icing orifices, mix it with ambient air and convey the mixed air to a spray tube located in the nose of the leading edge flap. The still warm mixed air is discharged from the spray tube, through orifices, into the nose of the leading edge flap. The air in the leading edge flap may be ejected over the top of the flap to provide additional boundary layer control, if desired.

12 Claims, 4 Drawing Figures

BOUNDARY LAYER CONTROL AND ANTI-ICING APPARATUS FOR AN AIRCRAFT WING

BACKGROUND OF THE INVENTION

This invention is directed to aircraft and more particularly to boundary layer control and thermal anti-icing apparatus suitable for use by jet aircraft.

In the past, a variety of methods of and apparatus for controlling the flow of the boundary layer air over the upper surface of an aircraft wing of a jet aircraft have been proposed and are in use. These methods and apparatus reduce the tendency of the boundary layer to separate during low speed operation when leading edge flaps are extended by increasing the momentum of the boundary layer air. In addition, a variety of methods of and apparatus for preventing ice build-up on the wings and/or leading edge flaps have been proposed and are in use. While such methods and apparatus have been somewhat successful, certain disadvantages remain to be resolved. This invention is directed to overcoming some of these disadvantages.

In general, boundary layer control and thermal anti-icing methods and apparatus of the prior art have generally operated independently of one another. In other words, prior art aircraft have used one apparatus for thermal anti-icing and another, independent, apparatus for boundary layer control. It will be appreciated that it would be desirable to provide a system that includes components common to both systems in order to reduce the overall number of components involved and, thereby, reduce the complexity and cost of the resultant aircraft.

Therefore, it is an object of this invention to provide a boundary layer control and thermal anti-icing apparatus that includes common components.

Another problem with prior art boundary layer control systems per se is their inability to bleed some of the compressor air from a jet aircraft for boundary layer control purposes without undesirable effects occurring. More specifically, prior to the instant invention, attempts to use compressor air for boundary layer control purposes have usually resulted in unacceptable thrust losses during critical flight operation conditions such as when an engine is out of commission, for example.

Therefore, it is another object of this invention to provide a boundary layer control system that uses engine compressor air without creating a detrimental effect, even under critical flight operation conditions.

Some prior art thermal anti-icing apparatus provide mixed air to a leading edge flap via telescoping ducts. The use of telescoping ducts is undesirable for a variety of reasons. For example, telescoping ducts require the use of mechanical components whereby they are subject to failure. Thus, it is desirable to provide mixed air to a leading edge flap without using telescoping ducts.

Therefore, it is a still further object of this invention to provide an apparatus for delivering mixed air to a leading edge flap without using telescoping ducts.

One still further problem with many prior art anti-icing devices, suitable for preventing ice build-up on the nose of an aircraft wing, relates to the thermal expansion that occurs when the temperature of the surrounding materials changes. Specifically, thermal expansion problems have been found to exist with prior art apparatus for preventing ice build-up on the nose of an aircraft wing.

Therefore, it is yet another object of this invention to provide an anti-icing apparatus that prevents ice build-up on the nose of an aircraft wing without creating thermal expansion problems.

SUMMARY OF THE INVENTION

In accordance with principles of this invention, a boundary layer control apparatus for a jet aircraft wing is provided. The boundary layer control apparatus includes a leading edge flap mounted for movement between a stowed position and an operative position. The leading edge flap is configured such that, when in its operative position, the curvature of the trailing surface of the flap, in combination with the nose curvature of the wing, forms a mixing and ejector nozzle. The boundary layer control apparatus also includes a duct adapted to bleed engine compressor air from an associated jet engine and inject the bleed air into the mixing and ejector nozzle formed between the flap and the wing nose. The injected air mixes with ambient air in the nozzle and the mixed air is ejected from the nozzle over the upper surface of the wing.

In accordance with further principles of this invention, the duct forms the nose of the wing and the hot compressor bleed air carried by the duct prevents ice forming on the nose of the wing when the flap is stowed. That is, the duct provides an anti-icing apparatus due to its nose location. Further, the thusly formed leading edge duct is attached to the wing structure by slip joints which allow the duct to expand and contract due to bleed air temperature changes without causing structural damages to the overall wing structure. Also, the air ejected from the duct (into the mixing and ejector nozzle when the flap is down), flows over the nose and provides further anti-icing by wiping away water droplets.

In accordance with further principles of this invention, a leading edge flap anti-icing apparatus for preventing ice build-up on the nose of the leading edge flap is also provided. The leading edge flap anti-icing apparatus comprises mixing tubes of a nontelescopic nature running between orifices formed in the leading edge duct and a spray tube located in the leading edge flap. The mixing tube includes a plurality of apertures which draw in ambient air as the compressor bleed air from the leading edge duct flows through the mixing tube. The mixing tube mixes the ambient air with the compressor bleed air and supplies it to the spray tube. The spray tube discharges the mixed air through orifices into the nose of the leading edge flap. This warm air prevents ice formation on the nose of the leading edge flap. If desired, the mixed air can be ejected from the nose of the leading edge flap so as to flow over the upper surface of the leading edge flap and provide additional boundary layer control.

It will be appreciated from the foregoing summary that the invention provides a boundary layer control and thermal anti-icing apparatus suitable for use by a jet aircraft. While, preferably, the apparatus performs both functions (boundary layer control and anti-icing) using common components, only one function can be performed, and other eliminated, if desired. In any event, an ejector nozzle formed by the nose and flap configurations, and bleed air carried by a wing duct, provides boundary layer control. Such control is provided without detrimental effects occurring, even under critical flight operations. This beneficial result occurs because the engine compressor bleed air requirements of the instant invention are less than the requirements of prior art apparatus or because the instant invention provides additional lift that overcomes the detriment created by thrust loss. The additional lift is provided by the blowing momentum augmentation created by the ejected boundary layer control air. Which of these two apsects create the specific beneficial result depends, of course, on the specific environment of use of the invention; that is, the aircraft using the invention. In addition, to boundary layer control, the invention provides thermal anti-icing. Thermal anti-icing is provided in the nose of the wing when the flap is retracted by hot engine compressor bleed air flowing through the duct forming the nose of the wing. In addition, thermal anti-icing, to some extent, is provided by the boundary layer control air which passes over the wing nose when the flap is stowed. Further, thermal anti-icing of the leading edge flap is provided by hot air, mixed with ambient air, flowing to the nose of the leading edge flap. Moreover, the anti-icing air utilized by the leading edge flap provides supplemental boundary layer control by being ejected over the upper surface of the leading edge flap.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
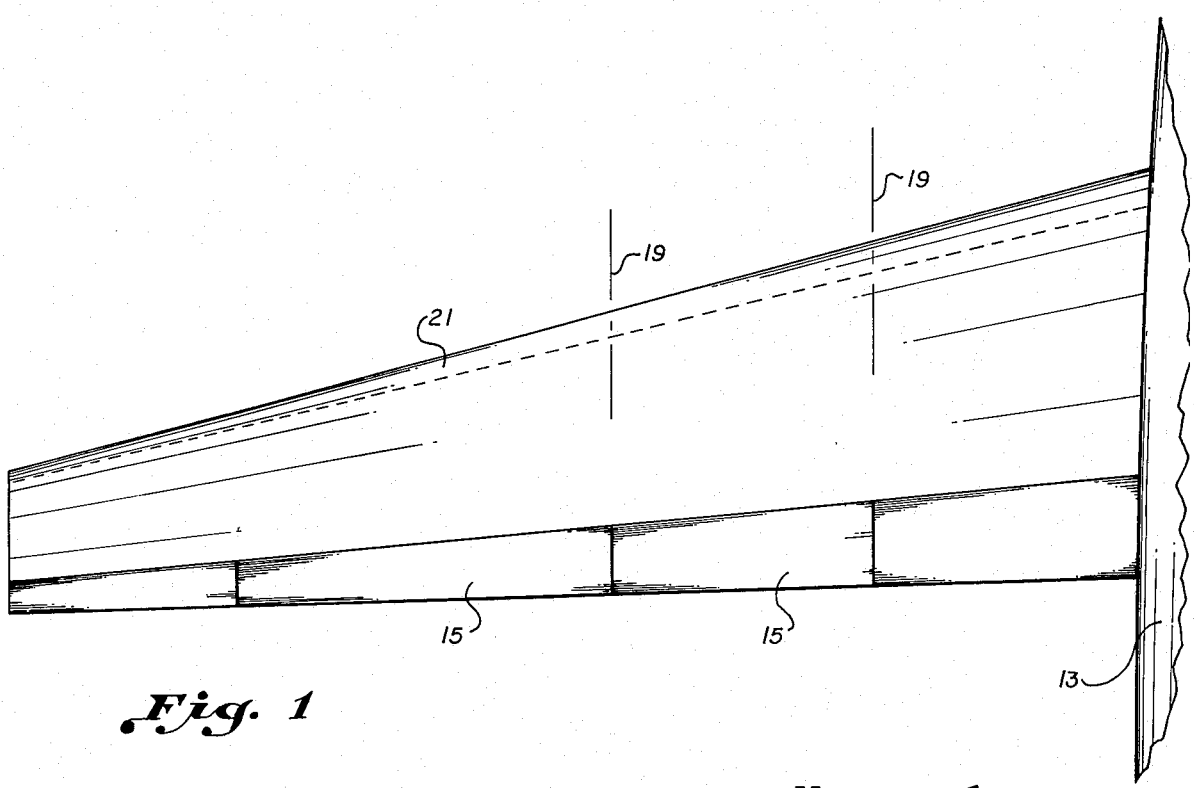
FIG. 1 is a top view of an aircraft wing illustrating the location of a leading edge duct formed in accordance with the invention.

Turning now to a description of the preferred embodiment of the invention, FIG. 1 illustrates a wing 11 projecting outwardly from a fuselage 13. Located along the trailing edge of the wing 11 are a plurality of independently controllable trailing edge flaps 15 and an aileron 17. As conventional, the aileron 17 is located near the outer end of the wing 11. A pair of jet engines represented by centerlines 19 are mounted on the wing 11, or hung therefrom by suitable structural support members (not showns). Compressor air is bled from the engines 19 and directed to a leading duct 21 by any suitable conduit means (also not illustrated).

The leading edge duct runs along the nose or leading edge of the wing 11 and, preferably, forms the nose, as hereinafter described. The duct carries compressor air bled from one or both engines, preferably from both engines. If desired, suitable valving means can be provided to control the volume of bleed air carried by the leading edge duct 21. As stated above, preferably, both engines supply some compressor air to the leading edge duct under normal flight operation conditions. However, under a critical flight operation condition, such as an engine out condition, one engine can supply compressor air adequate for the successful operation of the invention without unacceptable thrust losses occurring.

The engine compressor bleed air flowing in the leading edge duct is utilized for two purposes. One purpose is to provide thermal anti-icing and the other is to provide boundary layer control.

Figure 2:
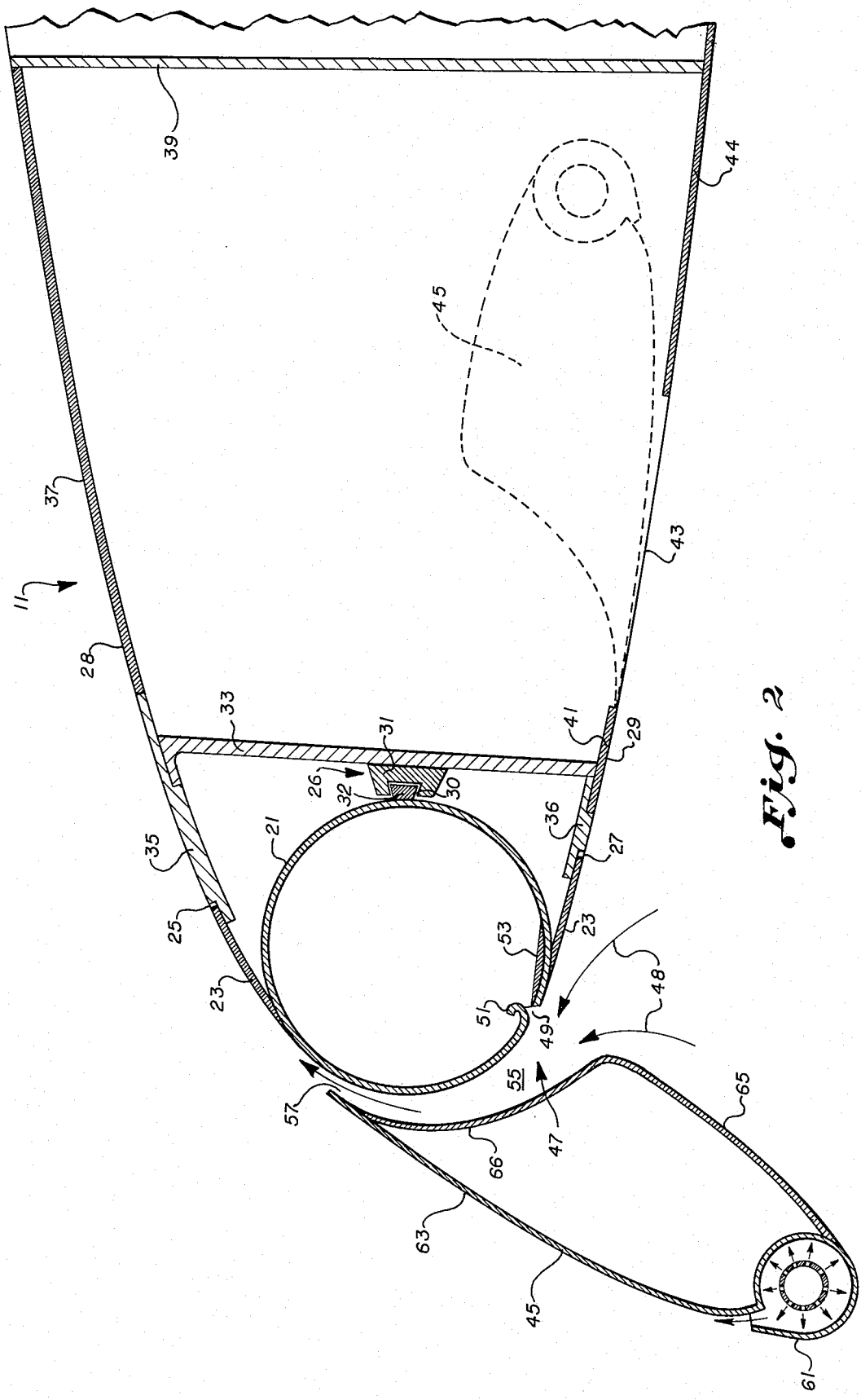
FIG. 2 is a first cross-sectional view of a wing and a leading edge flap arrayed, in accordance with the invention, for boundary layer control.

As will be appreciated by those skilled in the art, the compressor bleed air is relatively warm—450°F., for example. Because the leading edge duct forms the nose of the wing, the compressor bleed air is in thermal communication with the outer surface of the nose of the wing. While such thermal communication provides the desired anti-icing effect, it creates problems. Specifically, the high temperature air flowing through the leading edge duct creates thermal expansion problems which could have a detrimental effect. However, the invention overcomes these problems. More specifically, as illustrated in FIG. 2, the leading edge duct 21 is, preferably, a cylindrical duct which is attached by rearwardly and outwardly projecting plates 23 and upper and lower slip joints 25 and 27 to the upper and lower surfaces 28 and 29 of the wing 11. In addition, a slip joint dove tail support 26 attaches the leading edge duct to a vertical support plate 33 affixed in the wing 11.

The dove tail support comprises a longitudinal male member 32, dove tail in cross-section, affixed to the rear of the leading edge duct 21. The short side of the longitudinal male member is affixed to the duct and the long side is remote therefrom. The dove tail support also comprises a longitudinal female member 31 also dove tail in cross-section. The long side of the longitudinal female member is affixed to the vertical support plate 33, and includes a longitudinal dove tail slot 30 within which the longitudinal male member lies. The longitudinal dove tail slot 30 is larger in cross-sectional size than is the longitudinal male member whereby provision for expansion and contraction of the duct is provided.

The slip joints 25 and 27, as well as the dove tail support arrangement, allow the leading edge duct to expand and contract with respect to the wing 11 as the compressor bleed air carried therein increases and decreases in temperature without such expansion and contraction having a detrimental structural effect on the wing 11. The upper slip joint 25 comprises the tip of the upper rearwardly and outwardly projecting plate 23 and an upper longitudinal support element 35 having an undercut region in its front upper surface. The tip of the upper outwardly projecting plate 23 lies in the undercut region and is movable therein from front-to-rear with respect to the chord of the wing 11. The upper longitudinal support element 35 is attached to the top of the vertical support plate 33 and to the skin 37 forming the upper surface 28 of the wing 11 by any suitable means, such as rivets, for example. The skin 37 runs rearwardly and is supported by further spars or plates represented by a single spar 39 in FIG. 2.

The lower slip joint 27 comprises the tip of the lower rearwardly and outwardly projecting plate 23 and a lower longitudinal support element 36 having an undercut region in its front lower surface. The tip of the lower rearwardly and outwardly projecting plate 23 lies in the undercut region and is movable therein from front-to-rear with respect to the chord of the wing 11. The lower longitudinal support element is attached to the bottom of the vertical support plate 33 and to a skin element 41 forming a portion of the lower surface 29 of the wing 11 by any suitable means, such as rivets, for example.

Rearwardly disposed with respect to the skin element 41 is an aperture 43. Located beyond the aperture 43 is a further skin element 44 which runs rearwardly and is supported by the further spars 39. The aperture 43 allows a leading edge flap 45 formed in accordance with the invention to be stowed in the wing 11. A portion of the further skin element 45 may be moved in a hinged or other manner (not shown) during movement of the leading edge flap 45 from or to the stowed position so as to provide a relatively smooth wing undersurface when the flap is stowed.

The leading edge flap 45 is moved by any suitable mechanical means (not shown) well known to those skilled in the art, such as a hydraulically operated lever arm mechanism between an inoperative (stowed) position (shown by dashed lines in FIG. 2) and an operation position (shown by solid lines).

As will be better understood from the following description of the cross-sectional silhouette of the leading edge flap, when the leading edge flap is in its operative position, a mixing and ejector nozzle 47 is formed between the trailing surface of the leading edge flap 45 and the nose of the wing 11. The mixing and ejector nozzle 47 includes a mixing region 55 wherein ambient air 48 from beneath the wing 11 is mixed with compressor bleed air exiting from high velocity boundary layer control (BLC) nozzles 49 formed in the lower front one-half of the leading edge duct 21. In this regard, attention is directed to FIG. 4 which illustrates the BLC nozzles as comprising a plurality of rectangular shaped, relatively narrow, spaced nozzles lying along a longitudinal axis generally parallel to the longitudinal axis of the leading edge duct 21. The BLC nozzles are formed by curling a portion 51 of the leading edge duct 21 inwardly and by providing an adjacent flat bottom 53. The curl portions and the flat bottoms direct the compressor bleed air into the mixing region 55 of the mixing and ejector nozzle 47. The engine compressor bleed air is mixed in the mixing region 55 with ambient air 48 and the mixture is ejected over the upper surface 28 of the wing 11 by an ejector nozzle 57 formed at the extreme trailing edge of the leading edge flap. More specifically, the trailing edge of the leading edge flap and the nose of the wing 11, when the leading edge flap is in its operative position, converge upwardly in a circular manner as illustrated in FIG. 2. The termination of this convergence forms the nozzle 57 which directs the mixed air onto the upper surface of the wing 11.

Figure 3:
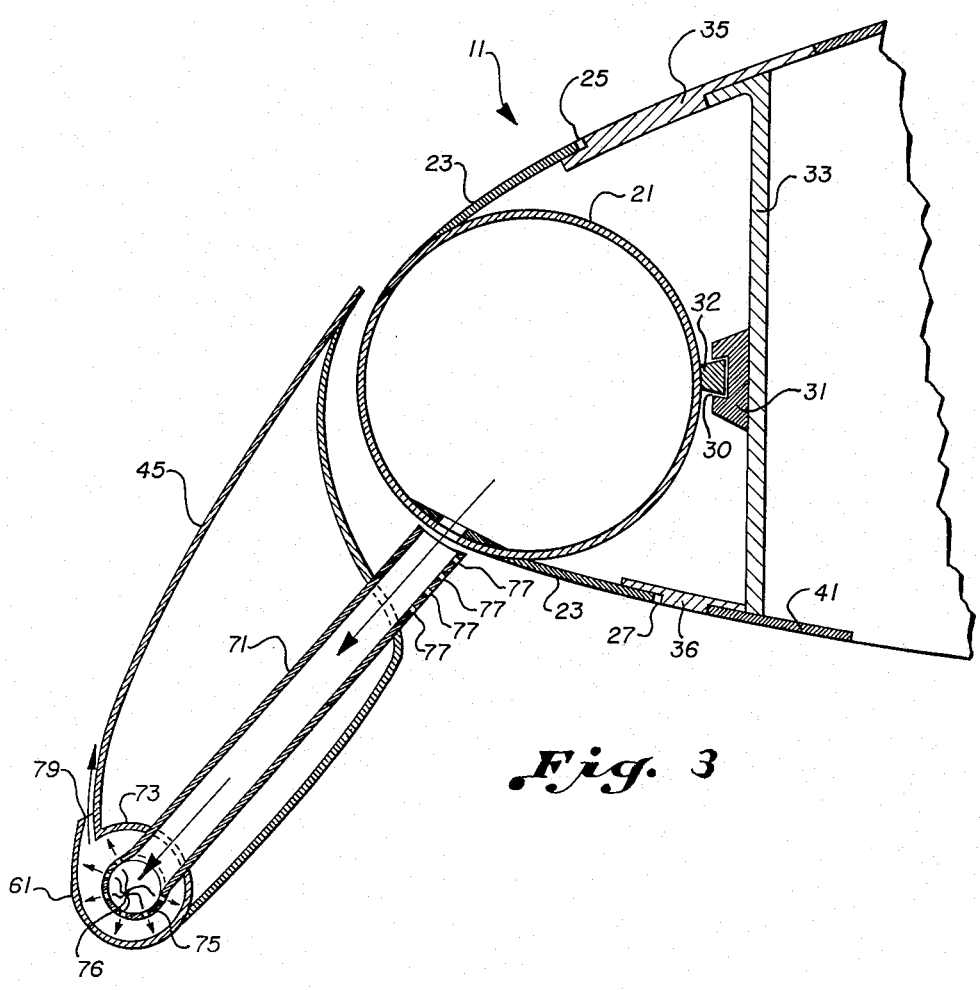
FIG. 3 is a second cross-sectional view of a wing and a leading edge flap arrayed, in accordance with the invention, for thermal anti-icing; and, FIG. 4 is a perspective view of a leading edge duct illustrating the location of anti-icing orifices and boundary layer control nozzles, and mixing tubes connecting a leading edge duct to a spray tube mounted in a flap.
Figure 4:
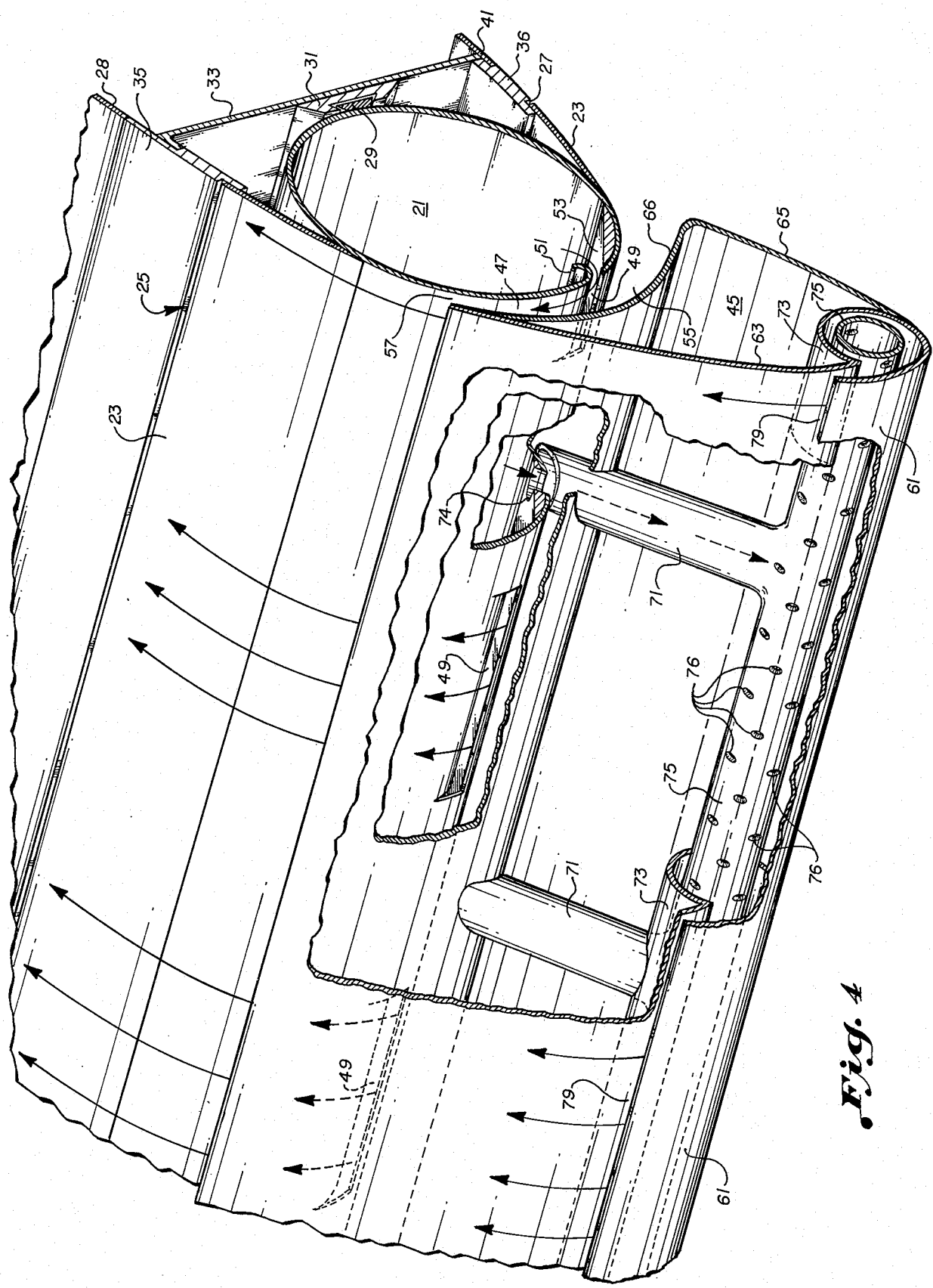

In cross-section, as can be seen in FIGS. 2, 3 and 4, the leading edge flap 45 includes a circular nose 61, an outwardly diverging top portion 63 and an outwardly diverging bottom portion 65. The top and bottom portions diverge slightly outwardly from the nose 61. The bottom portion is considerably shorter than is the top portion 63. The bottom portion as it terminates curves upwardly into a rear portion 66. The rear portion curves upwardly about the nose of the wing 11 such that the surface of the trailing portion forms one side of the mixing and ejector nozzle 47. The other side is formed by the surface of the nose. As described above, the curvature of the surfaces are such that they converge upwardly and then rearwardly toward one another.

At this point it should be noted, that the portion of the invention illustrated in FIG. 2 provides a plurality of beneficial functions. When the leading edge flap 45 is withdrawn, (high speed or cruise operation), the engine compressor bleed air, which is relatively hot and in thermal communication with the outer surface of the nose of the wing 11 prevents ice from forming on the nose. In addition, the high velocity air exiting from the BLC nozzles 49 and flowing over the nose of the wing portion also provide anti-icing. In this case anti-icing is provided because this air wipes water droplets away from the nose. On the other hand, during low speed operation, when the leading edge flap is extended, boundary layer control is provided. Boundary layer control is provided by the mixed air adding momentum to the boundary layer air and thus preventing separation of that air from the surface of the wing.

In addition to providing boundary layer control and anti-icing for the wing surface as described above, the invention also prevents ice from forming on the nose of the flap 45. A structure formed in accordance with the invention for performing this function is illustrated in FIGS. 3 and 4 and comprises: a plurality of flap supply mixing tubes 71; a flap nose tube 73; and, a spray tube 75. The flap supply mixing tubes 71 extend from circular orifices 74 (FIG. 4), formed in the leading edge duct 21 and located between the BLC nozzles 49, to the spray tube 75. The spray tube 75 has a longitudinal axis that is, preferably, coaxial with the longitudinal axis of the flap nose tube 73. The flap nose tube 73 forms the nose 61 of the leading edge flap 45.

The spray tube 75 includes a plurality of peripheral orifices 76 which communicate with the interior of the flap nose tube 73. In addition, the flap supply mixing tubes 71 include a plurality of rearwardly facing apertures 77 located between the rear surface 66 of the leading edge flap 45 and the nose of the wing 11. The apertures 77 draw ambient air from beneath the wing 11 into the interior of the flap supply mixing tubes 71. More specifically, as the relatively high pressure engine compressor bleed air leaves the leading edge duct 21 and passes through the orifices 74, it draws ambient air into the flap supply mixing tubes through apertures 77. Thus, a mixture of ambient air and engine compressor bleed air is supplied to the spray tube 75. The mixed air flow is emitted from the orifices 76 in the spray into the interior of the flap nose tube 73. This air, because it is combined compressed air bleed air and ambient air is cooler than the original engine compressor bleed air; however, its temperature is still adequate to prevent ice from forming and building up on the nose of the leading edge flap 45. The mixed air is emitted from the flap nose tube 73 via a thermal anti-icing nozzle 79. Preferably, the thermal anti-icing nozzle 79 directs this air over the upper surface of the leading edge flap 45 to provide additional boundary layer control.

It will be appreciated from the foregoing description of a preferred embodiment that the invention provides an apparatus for performing a plurality of functions utilizing some of the same components. Specifically, the apparatus of the invention provides boundary layer control and thermal anti-icing using many common components. Basically, the invention comprises a flap which, when moved to an operative position, creates a mixing and ejector nozzle. The mixing and ejector nozzle mixes ambient air with hot compressor bleed air and ejects the mixture onto the upper surface of the wing to provide boundary layer control. The hot compressor bleed air is provided by a leading edge duct forming the nose of the wing. Because the compressor bleed air is relatively warm, when the leading edge flap is stowed, the compressor bleed air warms the ducts and, thus, prevents ice formation on the nose of the wing 11. In addition, the invention provides a means for preventing ice from forming on the nose of the leading edge flap when the leading edge flap is in its operative position. The apparatus for preventing such ice formation is relatively uncomplicated in that it merely includes a plurality of fixed position tubes (not telescoping) oriented to mix some of the hot compressor bleed air with ambient air and direct the mixture into the nose of the leading edge flap. The mixed air has a temperature adequate to heat the nose of the leading edge flap and thus prevent ice formation. Preferably, the mixed air is ejected from the nose of the leading edge flap over the upper surface of the leading edge flap to provide additional boundary layer control.

It also will be appreciated from the foregoing description of a preferred embodiment that all the functions of the invention are carried out by a relatively uncomplicated mechanism. Moreover, this mechanism overcomes the thermal expansion disadvantages of prior art systems. Finally, the invention allows compressor bleed air to be used for boundary layer control and thermal anti-icing without creating unacceptable thrust losses during critical flight operation, such as an engine out condition.

While a preferred embodiment of the invention has been illustrated and described, it will be appreciated by those skilled in the art and others that various changes can be made therein without departing from the spirit and scope of the invention. Hence, the invention can be practiced otherwise than as specifically described herein.

The embodiments of the invention in which exclusive property or privilege is claimed are defined as follows:

1. A thermal anti-icing apparatus for an aircraft wing having at least one jet engine associated therewith, said thermal anti-icing apparatus comprising:
   1. a duct mounted in the nose of said wing so as to be in direct thermal communication with the outer surface of the tip of said nose, said duct being adapted to carry relatively high temperature air bled from said at least one jet engine and, thereby, warm said nose of said wing;
   2. thermal expansion attachment means for attaching said duct to said wing in a manner such that said duct can expand and contract as the temperature of the air carried by said duct changes without said expansion and contraction having a detrimental effect on the overall structure of said wing, said thermal expansion attachment means including:
      a. an upper, outwardly projecting plate having one edge attached to said duct;
      b. an upper slip joint suitable for attaching an edge of said upper, outwardly projecting plate, remote from said edge attaching said upper, outwardly projecting plate to said duct, to the upper surface of said wing;
      c. a lower, outwardly projecting plate having one edge attached to said duct;
      d. a lower slip joint suitable for connecting one edge of said lower, outwardly projecting plate, remote from said edge attaching said lower, outwardly projecting plate to said duct, to said lower surface of said wing; and,
      e. a longitudinal, dove tail slip joint comprising a male member affixed to one of said duct and said wing and a female member affixed to the other of said duct and said wing, the interface between said male and female members being loose to allow said duct to thermally expand and contract; and
   3. first aperture means formed in said duct for allowing said high temperature air bled from said at least one jet engine to escape from said duct, said first aperture means including a plurality of apertures positioned such that escaping bleed air is directed so as to flow over the nose of said wing and, thence, over the upper surface of said wing.

2. A thermal anti-icing apparatus as claimed in claim 1, wherein said duct forms the nose of said wing.

3. A thermal anti-icing apparatus for an aircraft wing having at least one jet engine and a leading edge flap movable between a stowed position and an operative position whereat said leading edge flap is located adjacent to the nose of said wing associated therewith, said thermal anti-icing apparatus comprising:
   1. a duct mounted in the nose of said wing so as to be in direct thermal communication with the outer surface of the tip of said nose, said duct being adapted to carry relatively high temperature air bled from said at least one jet engine and, thereby, warm said nose and said wing;
   2. thermal expansion attachment means for attaching said duct to said wing in a manner such that said duct can expand and contract as the temperature of the air carried by said duct changes without said expansion and contraction having a detrimental effect on the overall structure of said wing;
   3. first aperture means formed in said duct for allowing said high temperature air bled from said at least one jet engine to escape from said duct;
   4. non-telescoping tube means mounted in said leading edge flap and arrayed so as to form a conduit means running between the nose of said leading edge flap and the nose of said wing when said leading edge flap is in said operative position for conveying bleed air from said duct to the nose of said flap;
   5. second aperture means formed in said duct and located in the region of the nose of said wing so as to provide a pathway between the interior of said duct and the region adjacent the nose of said wing, said second aperture means also located so as to be aligned with one end of said non-telescoping tube means when said leading edge flap is in said operative position such that the bleed air exiting from said duct via said second aperture means flows into said non-telescoping tube means; and,
   6. a flap nose tube located in the nose of said leading edge flap so as to be in thermal communication with the exterior surface of the nose of said leading edge flap, the end of said non-telescoping tube means remote from the end alignable with the second aperture means being in communication with the interior of said flap nose tube whereby said bleed air flowing in said non-telescoping tube means flows into said flap nose tube.

4. A thermal anti-icing apparatus as claimed in claim 3, wherein:
   said first aperture means comprises a first plurality of apertures positioned such that escaping bleed air is directed so as to flow over the nose of said wing and, thence, the upper surface of said wing;
   said second aperture means comprises a second plurality of apertures formed in said duct and spaced between said first plurality of apertures; and,
   said non-telescoping tube means comprises a plurality of tubes running between said second plurality of apertures formed in said duct and said flap nose tube, said plurality of tubes including apertures therein, said tube apertures lying in a space formed between the trailing surface of said leading edge flap and the nose of said wing and adapted to draw in ambient air as said bleed air flows through said tubes so that mixed bleed air flows into said flap nose tube.

5. A thermal anti-icing apparatus as claimed in claim 4, wherein said flap nose tube includes means for ejecting said mixed bleed air, flowing to said flap nose tube through said plurality of tubes, over the upper surface of said leading edge flap.

6. A thermal anti-icing apparatus as claimed in claim 5 including an orifice tube mounted in said flap nose tube in a coaxial manner, said orifice tube being connected to said plurality of tubes to receive said mixed bleed air and including a plurality of orifices for emitting said mixed bleed air into said flap nose tube.

7. A boundary layer control and thermal anti-icing apparatus for an aircraft wing having at least one jet engine associated therewith, said boundary layer control and thermal anti-icing apparatus comprising:
   1. a duct mounted in the nose of said wing so as to be in direct thermal communication with the outer surface of the tip of said nose, said duct adapted to carry relatively high temperature air bled from said at least one jet engine, and, thereby, warm said nose of said wing;
   2. boundary layer control nozzles formed in said duct so as to provide a communication path between the interior of said duct and the nose of said wing;
   3. a leading edge flap movable between a stowed position and an operative position wherein said flap is located adjacent to said nose of said wing, the adjacent surfaces of said leading edge flap and the nose of said wing when said leading edge flap is in said operative position converging upwardly and rearwardly to form a mixing and ejection nozzle adapted to receive bleed air from said boundary layer control nozzles and draw ambient air from beneath said wing, mix said bleed air and said ambient air, and eject said mixture over the upper surface of said wing to provide boundary layer control; and,
   4. thermal expansion attachment means for attaching said duct to said wing in a manner such that said duct can expand and contract as the temperature of the air carried by said duct changes without said expansion and contraction having a detrimental effect on the overall structure of said wing, said thermal expansion and attachment means including:
      a. an upper outwardly projecting plate having one edge attached to said duct;
      b. an upper slip joint suitable for attaching an edge of said upper outwardly projecting plate, remote from said edge attaching said upper outwardly projecting plate to said duct, to the upper surface of said wing;
      c. a lower outwardly projecting plate having one edge attached to said duct;
      d. a lower slip joint suitable for connecting one edge of said lower outwardly projecting plate, remote from said edge attaching said lower outwardly projecting plate to said duct, to said lower surface of said wing; and,
      e. a longitudinal, dovetailed slip joint comprising a male member affixed to one of said duct and said wing and a female member affixed to the other of said duct and wing, the interface between said male and female members being loose to allow said duct to thermally expand and contract.

8. A boundary layer control and thermal anti-icing apparatus as claimed in claim 7, wherein said duct forms the nose of said wing.

9. A boundary layer control and thermal anti-icing apparatus for an aircraft wing having at least one jet engine associated therewith, said boundary layer control and thermal anti-icing apparatus comprising:
   1. a duct mounted in the nose of said wing so as to be in direct thermal communication with the outer surface of the tip of said nose, said duct adapted to carry relatively high temperature air bled from said at least one jet engine, and, thereby, warm the nose of said wing;
   2. boundary layer control nozzles formed in said duct so as to provide a first communication pathway between the interior of said duct and the nose of said wing;
   3. a leading edge flap movable between a stowed position and an operative position wherein said flap is located adjacent to said nose of said wing, the adjacent surfaces of said leading edge flap and the nose of said wing when said leading edge flap is in said operative position converging upwardly and then rearwardly to form a mixing and ejection nozzle adapted to receive bleed air from beneath said wing, mix said bleed air and ambient air, and eject said mixture over the upper surface of said wing to provide boundary layer control;
   4. non-telescoping tube means mounted in said leading edge flap and arrayed so as to provide a conduit extending between the nose of said leading edge flap and the nose of said wing when said leading edge flap is in its operative position for conveying bleed air from said duct to the nose of said flap;
   5. aperture means formed in said duct and located between said boundary layer control nozzles so as to provide a second communication path between said duct and the nose of said wing, said aperture means being aligned with one end of said non-telescoping tube means when said leading edge flap is in said operative position in order for said bleed air passing through said at least one aperture to flow into said non-telescoping tube means; and,
   6. a flap nose tube located in the nose of said leading edge flap so as to be in thermal communication with the exterior surface of the nose of said leading edge flap, the end of said non-telescoping tube means remote from the end aligned with said aperture means formed in said duct being in communication with the interior of said flap nose tube whereby said bleed air flowing in said non-telescoping tube means flows into said flap nose tube.

10. A boundary layer control and thermal anti-icing apparatus as claimed in claim 9, wherein:

said aperture means comprises a plurality of apertures formed in said duct and spaced between said boundary layer control nozzles; and, said non-telescoping tube means comprises a plurality of tubes running between said plurality of apertures formed in said duct and said flap nose tube, said plurality of tubes including apertures therein, said tube apertures lying in a space formed between the trailing surface of said leading edge flap and the nose of said wing and adapted to draw in ambient air as said bleed air flows through said tubes so that mixed bleed air flows into said flap nose tube.

11. A boundary layer control and thermal anti-icing apparatus as claimed in claim 10, wherein said flap nose tube includes means for ejecting said mixed bleed air, flowing to said flap nose tube through said plurality of tubes, over the upper surface of said leading edge flap.

12. A boundary layer control and thermal anti-icing apparatus as claimed in claim 11 including an orifice tube mounted in said flap nose tube in a coaxial manner, said orifice tube being connected to said plurality of tubes to receive said mixed bleed air and including a plurality of orifices for emitting said mixed bleed air into said flap nose tube.

* * * * *